US008168703B2

(12) United States Patent
Molta et al.

(10) Patent No.: US 8,168,703 B2
(45) Date of Patent: May 1, 2012

(54) FLEXIBLE PANEL WITH INTERRUPTED SHEATHS FOR TIE RODS

(75) Inventors: PierCarlo Molta, Prato (IT); Enrico Grassi, Montemurlo (IT)

(73) Assignee: Veleria Marco Holm S.R.L., Campi Bisenzio (IT)

( * ) Notice: Subject to any disclaimer, the term of this patent is extended or adjusted under 35 U.S.C. 154(b) by 1003 days.

(21) Appl. No.: 10/587,096

(22) PCT Filed: Jan. 18, 2005

(86) PCT No.: PCT/IT2005/000025
§ 371 (c)(1),
(2), (4) Date: Aug. 19, 2008

(87) PCT Pub. No.: WO2005/070759
PCT Pub. Date: Aug. 4, 2005

(65) Prior Publication Data
US 2008/0302290 A1    Dec. 11, 2008

(51) Int. Cl.
*E04D 5/00* (2006.01)
*B63H 9/06* (2006.01)
(52) U.S. Cl. .......... 524/63; 52/74; 52/573.1; 52/630; 114/102.31; 428/105; 428/107; 428/110; 428/113
(58) Field of Classification Search .......... 52/2.22–2.24, 52/63, 74, 223.14, 573.1, 630; 428/105, 428/107, 109, 110, 113; 114/102.31
See application file for complete search history.

(56) References Cited

U.S. PATENT DOCUMENTS

| | | | | |
|---|---|---|---|---|
| 1,849,965 | A | | 3/1932 | Switlik |
| 2,960,282 | A | | 12/1952 | Melges |
| 2,932,121 | A | * | 4/1960 | Weitzel .......... 428/123 |
| 2,620,760 | A | | 11/1960 | Winzen |
| 3,109,612 | A | | 11/1963 | Winker et al. |
| 3,354,892 | A | | 11/1967 | Frieder |
| 3,442,750 | A | * | 5/1969 | Wilcox .......... 428/109 |
| 4,309,464 | A | * | 1/1982 | Rauch .......... 428/11 |
| 4,831,953 | A | | 5/1989 | Conrad |
| 4,945,848 | A | * | 8/1990 | Linville .......... 114/102.31 |
| 5,006,390 | A | * | 4/1991 | Kavesh et al. .......... 428/105 |
| 5,097,784 | A | | 3/1992 | Baudet |
| 5,110,387 | A | | 5/1992 | Jascinski et al. |
| 5,333,568 | A | * | 8/1994 | Meldner et al. .......... 114/102.31 |
| 7,055,288 | B2 | * | 6/2006 | Coogan .......... 52/223.14 |
| 2002/0085153 | A1 | | 7/2002 | Choi et al. |
| 2003/0070152 | A1 | | 4/2003 | Muller |

FOREIGN PATENT DOCUMENTS

| | | |
|---|---|---|
| GB | 1338451 | 11/1973 |
| JP | 9171649 | 9/1984 |
| RU | 0647184 | 2/1979 |

* cited by examiner

*Primary Examiner* — William Gilbert
*Assistant Examiner* — Matthew J Smith
(74) *Attorney, Agent, or Firm* — Abelman, Frayne & Schwab

(57) ABSTRACT

Membrane body (1) comprising at least one pair of panels (10, 11) connected together in an adhesive manner and for each pair of said panels (10, 11), at least one flexible sheath (15) arranged stably according to a set pattern to resist membrane stress acting on the panels (10, 11); each sheath (15) housing a respective tie rod (16), connected to the panels (10, 11) in an end position in a set manner in such a way as to be suitable for resisting normal stress to free the panels (10, 11) from the respective membrane stress, thereby maintaining the group of the panels (10, 11) flexible and maintaining the corresponding production method.

12 Claims, 2 Drawing Sheets

FLEXIBLE PANEL WITH INTERRUPTED SHEATHS FOR TIE RODS

The present invention relates to a membrane body that finds valid employment in the sector of sails for boats and awnings in the field of civil engineering.

In the field of sailing boats, boats are known that are equipped with at least one principal sail, or mainsail, substantially triangular in shape, that is bent vertically on a mast and horizontally to a boom, and a bow, or jib, that is carried slidingly to the bow stay. Needless to say, the sails are of course the means of propulsion of sailing boats, and perform their drive function when they are hoisted, but must be struck when the boat is moored, and must then be gathered in and folded to be placed below deck or stored elsewhere.

It is known that sails are made is such a way as to be able to take on an aerodynamic conformation once they have been hoisted and flattened according to the wind and intended course. The conformation of the sail depends on the ratio between the curves that are assigned both along the front side, which is bent on a stay or along the boltrope of a mast, and along the lower side, which is suitable for remaining free for being bent in a boom, in such a way that the sail, once it has been flattened through the sheets in conditions of use, cuts horizontal curves, each of which is as close as possible to the curvilinear length of a set aerodynamic profile.

As is known, the sails have a negligible thickness in relation to their respective extent and are therefore capable of resistance only to tensile stress. For this reason, sails are structurally classifiable as membrane bodies, and are therefore preferably reinforceable with tie rods, in such a way as to keep the required lightness and convenience of use. In the sector of sails that is reinforced with tie rods it is known that production proceeds by assembling sailcloths obtained by hot lamination of pairs of panels of plastic material set and reinforced by the intermediate insertion of a plurality of tie rods distributed according to a set pattern, and then by assembling the sailcloths together two by two to form an entire sail as illustrated in U.S. Pat. No. 4,593,639, which is owned by the American company SOBSTAD SAILMAKERS INC., the teachings of which are included for the sake of convenience. Horizon—Performance Sails, a manufacturer of US sails, had already marketed sails using Tape Drive technology in September 1985, which enabled sails to be constructed reinforced with continuous tie rods in carbon or Kevlar applied through an adhesive connection, a technology that was then transferred to the United States sailmaker Ulmer & Kolius.

For the purposes of clarity, it is pointed out that "sailcloth" is taken to mean a cloth or strip of canvas that is connected on respective longitudinal sides through stitching or through gluing to form a sail or a curtain, or an awning.

In U.S. Pat. No. 5,097,784 of the US Company NORTH SAILS GROUP, INC., the teachings of which are included for the sake of convenience, sails are disclosed consisting of a single panel or cloth having three layers, and particularly an outer base or structural film layer, a structural layer of load bearing yarns, which are disposed over the film layer, and an outer protective layer over the yarn layer (column 3, lines 16-19). So sails according to this patent are rigidly reinforced through the intermediate insertion of a plurality of tie rods distributed according to a set pattern.

The sails that are obtained by applying the teachings of the two aforementioned patents individually or jointly have the very particular feature of being particularly stiff in use so as to enable the sails thus constructed to be compared to the wings of aircraft, which are known to be very efficient. In both cases, the sails made of laminate and internally reinforced, produced by implementing the two aforementioned patents have certain drawbacks, including the fact that the adhesive that is distributed on the panels undergoes a process of very rapid ageing, which is followed by progressive loss of flexibility of the sails overall.

The progressive loss of flexibility of the sails thus constructed leads to numerous drawbacks, the effects of which are felt as the sails are hoisted, both for manoeuvring and for adjustment and in folding operations that follow the striking. Once the sails are stiffened, they are very difficult to rig, handle and maintain, in addition of course to creating complications both during hoisting and subsequently during striking, above all if such tasks have to be performed quickly at sea in adverse meteorological conditions. In addition, stiffening of the sail slows down the change of tack in bow or stern turns of the principal or mainsail, and involves limitations in the management of the route that it is desired to complete.

Furthermore, once the sails have to be folded, it becomes necessary to pay great attention to limit the number of folds in order not to further impair the state of the already stiffened sail, and to prolong its life as much as possible. It is immediately understandable that this prudence leads not only to loss of time but significant space occupied by the folded sail, with the result that the sail is difficult to manage because it is very bulky, difficult to place in its bag, and to transport.

Naturally, the rapid loss of their mechanical properties makes such sails usable for only a limited time and therefore makes frequent replacement necessary, the costs of which are justified for use in regatta boats used in important competitions, in which the percentage of the investment of the ship owner is consciously high and with it the awareness that the equipment must be replaced frequently to obtain good results.

In the case of leisure boats, in particular in the case of those equipped to be hired, the sails disclosed above are little used because of their respective stiffness inasmuch as on such boats the sails are on return to port preferably wound around the bow stay, as in the case of forward sails, or around the mast or boom in the case of the mainsail. In particular, sails in Dacron are preferred to the sails disclosed above, Dacron is a textile material that is easily windable in a small radius on a rollerjib or is refoldable and very resistant to fatigue-inducing stress, but is elastic. Therefore, by using sails in Dacron, it is implicit that the possibility of having stiff sails once hoisted and made ready to use is foregone. It should be noted that the name Dacron is a registered trademark of the company Du Pont.

In order to produce sails that overcome the drawbacks of the sails made of Dacron, and of the sails of Sobstad and of North Sails according to the teachings of the two patents quoted above, it was decided to use a concept that is currently not applied either to the sector of sails or to the sector of awnings, and in particular a membrane body that shares with sails the same problems of maintenance of the stiffness of the shape used, together with the need to be easily manageable in conditions of folding when at rest.

In the field of awnings made with panels of flexible material reinforced by the tie rods that adhere to the material the foregoing disclosure is confirmed with the sole difference that the panels for the sails are flat when at rest, and assume their shape in combination with the equipment for which they are designed, whilst the flexible membrane bodies that are used to perform the function of awning can be intrinsically convex.

An object of the present invention is to create a membrane body that is free of the drawbacks illustrated above, that is suitable for assuming under a load a set shape without undergoing deformation due to the permissible aerodynamic load through a plurality of tie rods distributed according to a set pattern, and to keep said set shape flexible over time in the absence of a load.

According to the present invention a membrane body is made, the properties of which are disclosed in at least one of the claims that follow.

The present invention furthermore relates to a sail that finds valid use in the sector of regatta and leisure boats.

An object of the present invention is to make a sail that is free from the drawbacks illustrated above, that remains flexible when at rest and is suitable for taking on a set shape when under a load.

According to the present invention a sail is made the properties of which are disclosed in at least one of the claims that follow.

The present invention furthermore relates to a method for the production of membrane bodies usable with the function of awnings in the field of civil engineering or of sails for regatta and leisure boats.

An object of the present invention is to provide a method for making a membrane body or a sail that are free from the drawbacks disclosed above, and which remain flexible in the absence of a load acting thereupon, and which under the load assume a set form through a plurality of tie rods distributed according to a set pattern.

According to the present invention a method is supplied for making a membrane body, or a sail that does not need the use of adjustable supports to form the sail with a special shape as in U.S. Pat. No. 5,097,784, and the properties of which are disclosed in at least one of the claims that follow.

BRIEF DESCRIPTION OF THE DRAWINGS

The invention will now be disclosed with reference to the attached drawings, which illustrate some non-limiting embodiments, in which.

DETAILED DESCRIPTION OF THE PREFERRED EMBODIMENTS

Figure 1:
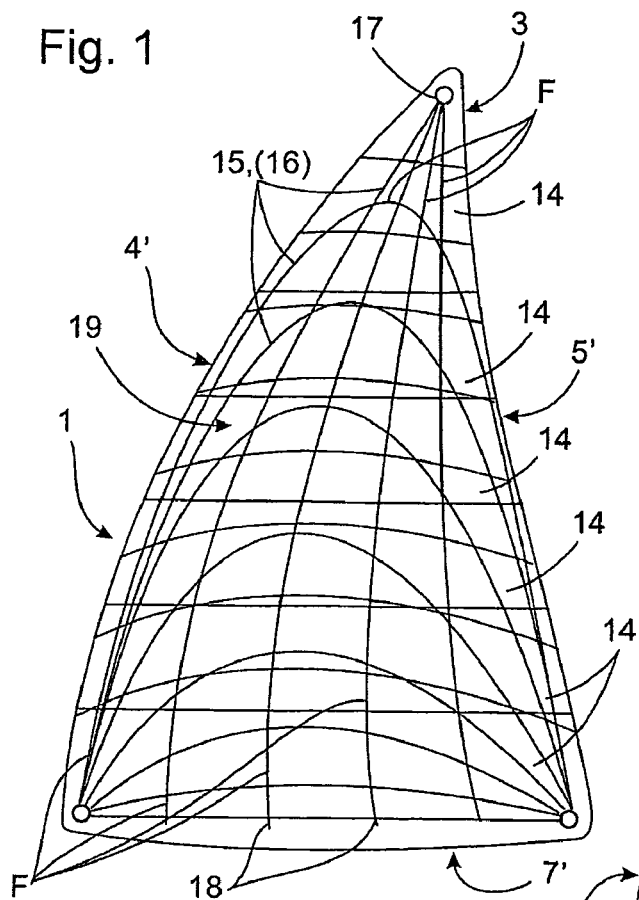
FIG. 1 is a plan view of a first preferred embodiment of a two-dimensional membrane body according to the present invention.

In FIG. 1, 1 indicates overall a membrane body of triangular shape, which is shaped to take on during use a set aerodynamic conformation and is usable as a sail for regatta or leisure boats due to its properties of lightness. This body 1, which in this text will be called a 'sail' unless otherwise stated, and comprises at least one sailcloth 14, is provided in its turn with a pair of panels 10 and 11, preferably visible in FIGS. 3 and 4, made of a plastic laminate, for example polyester-based such as mylard, and delimited by a plurality of sides.

Figure 2:
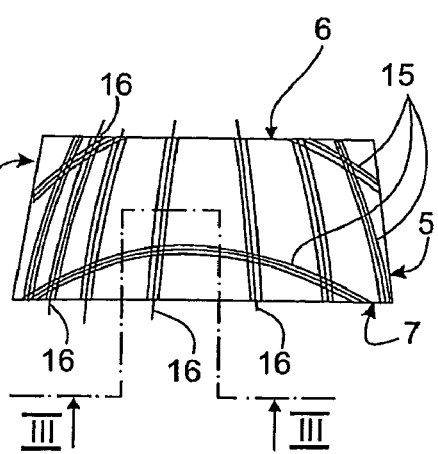
FIG. 2 is a plan view on an enlarged scale, with parts removed for the sake of clarity, of a detail taken from FIG. 1.

With reference to FIG. 2, each sailcloth 14 is delimited by three of four edges, as in the case of the sailcloth 14 in FIG. 2, and in particular two side edges 4 and 5 converging in a peak 3 visible in FIG. 1, a substantially straight top edge 6 and a base edge 7. The edge 4 is arranged in the bow and the edge 5 is arranged on the stern, respectively to the left and the right in FIG. 2, and at least one of the edges 6 and 7 can be curved to supply the so-called "billow" to the sail 1, although this curve is not shown in FIG. 2 for the sake of convenience, because of the respective smallness that would make it unappreciable in small-scale drawings. It should be remembered that the proportions assigned to the sailcloth 14 in FIG. 2 are deliberately imaginary and that the sole object of FIG. 2 is to make the conformation of the elements constituting the structure of the sail 1 more easily understandable.

Each panel 10 is delimited on the panel 11 side by a respective face 12 and each panel 11 is delimited on the panel 10 side by a respective face 13. The faces 12 and 13 face each other and are connected together in an adhesive mode to define a sailcloth 14 of the sail 1, more clearly visible in FIG. 2, and independently of the technology with which this type of connection has been obtained. Each sailcloth 14 has, between the prospective panels 10 and 11, a plurality of flexible sheaths 15 associated stably with the sailcloth 14, and of a reduced section if compared with the dimensions of the sail 1 and comparable with the total thickness of the sail 1. As regards what has been disclosed above, the sheaths 15 are stably included between the faces 12 and 13 and are arranged according to a set pattern, defined on the basis of the distribution of the lines of forces acting on the sail 1 in operation. Each sheath 15 houses, at least along the entire respective length, a tie rod 16 connected in a free manner to the panels 10 and 11, in particular inside the sheath 15, and is suitable for being stiffly connected to the sail 1 at the peak 3, or the edges 4', 5' and 7', visible in the FIG. 1, through respective free end portions 17 and 18. In this way, each tie rod 16 is suitable for acting as a limiting organ of the deformation of the sail section with which it is associated through the corresponding sheath 15, and through the particular manner with which it is connected to the sail 1 it is suitable for exerting this function only when the sail 1 has to act as a propulsive element of the boat, thus when the sail 1 is flattened through the known sheets and which are not illustrated to be subjected to the aerodynamic load. In other words, the group of tie rods 16 of the sail 1 defines a weight-bearing structure 19 suitable for reacting to membrane stress, leaving the panels 10 and 11 the sole function of gathering the wind and conveying it in such a way as to generate the aerodynamic power in the desired proportions. In particular, the tie rods 16 of the structure 19, by bearing normal tensile stress action, free each sailcloth 14 of the membrane stress acting during use on the sail 1. Naturally, it goes without saying that the material of which the panels 10 and 11 are made has greater/lesser stiffness than that of the tie rods 16 and so the stiffness of the sail 1 must be all the greater the greater the ratio between stiffness of the tie rods and of the material of the panels is than 1. Furthermore, the material with which each panel 10 and 11 is made has the function of protecting the sheaths 15 from ultraviolet rays, from brine and from lacerations that could occur if the sheaths and tie rods 16 were accessible from the exterior.

From what has been disclosed above it is clear that the structure 19 enables each tie rod 16 to be longitudinally movable inside the respective sheath 15 indefinitely over time, and therefore enables the sail 1 to be invariably flexible over time in conditions of absence of loads. Naturally, the useful length of each sheath 15 measured on one of its external faces 20 and 21 of the sail 1 is the same or slightly less than the useful length of the corresponding tie rod 16 measured in the same manner, or rather the distance between the connection to the panel 10 of the ends 17 and 18 of each tie rod 16. It may be appropriate to point out that the sail 1 in FIG. 1 overcomes the problems of sails made according to U.S. Pat. No. 4,593,639 quoted above in terms of maintenance of the mechanical properties connected to the corresponding flexibility and that the sail 1 in FIG. 7 overcomes the problems of sails made according to the quoted U.S. Pat. No. 5,097,784. In both cases, the tie rods are completely impregnated with adhesives so that the adhesion between the tie rods and the panels of the sailcloths of the sail is complete, so that deterioration of the latter is very rapid and with it the decrease in flexibility.

Figure 3:
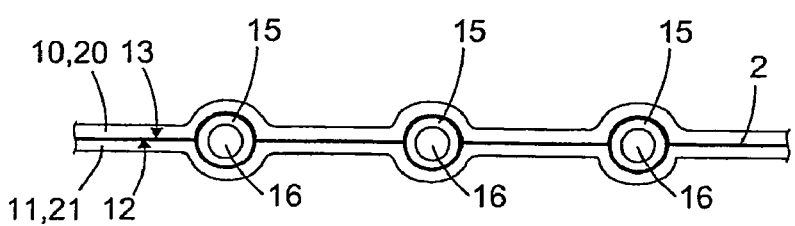
FIG. 3 illustrates, on an enlarged scale for the sake of clarity, the section of the FIG. 2 according to line III-III.

With reference to FIG. 3, the sail 1 is shown in section, and from this figure it is easy to understand how the panels 10 and 11 are coupled to the sheath 15 and how the latter separates the tie rod 16 from the panels 10 and 11. In particular, at least one of the faces of the panels 10 and 11 is adhesive, it does not matter if the corresponding panel 10 or 11 is marketed in this state or if the corresponding face 12/13 has been made adhesive by manufacturing of the sail 1 through the distribution of adhesive upstream of the coupling of the panels 10 and 11 together. In all cases, the adhesive 2 must preferably have a relatively low and preferably temporary adhesive power to enable the correction of inaccurate positioning of the sheaths 15 and of the respective tie rods 16 during coupling. On the other hand, such an adhesive 2 must have selectably increasable adhesive power following ascertaining of the correct corresponding positioning of the panels 10 and 11 and of the sheaths 15 between them. It is easy to understand that this adhesive 2 could be preferably but not necessarily of the heat meltable type, to be suitable for performing its adhesive function only following the application of heat by local heating or following hot lamination. The choice of using an adhesive activatable by heat as an element suitable for sealing together the panels 10 and 11 of each sailcloth 14 is particularly practical, as the delivery of heat is a technological procedure that is easy to apply both by operating on reduced surfaces and by operating on very extended surfaces. On the other hand, if it were decided to use adhesive that is active at ambient temperature, lamination could be performed cold through the application of pressure between rollers or similar known organs that are not shown in such a way as to seal the panels 10, 11 together and then connect the sheaths 15 to the panels in a substantially stiff manner.

Figure 7:
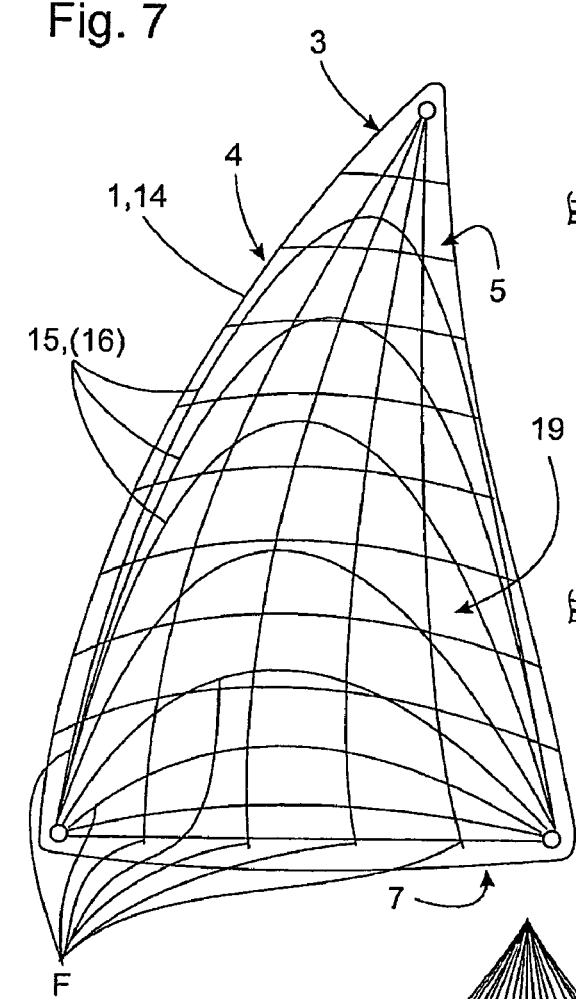
FIG. 7 is a schematic perspective view of a second preferred embodiment of FIG. 1.

This applies also to the sail 1 in FIG. 7, provided with a single sailcloth 14 of triangular shape, that has been obtained from a skin produced by assembly of a plurality of panels 10 cut like the sailcloth in FIG. 2 and assembled two by two on relative transverse edges to have a three-dimensional conformation when in operation, or which has been obtained from a single panel 10 with a triangular shape itself. On this dual skin of panel 10 of FIGS. 3 and 4 lines have been plotted corresponding to the unbroken force lines F that go from the peak 3 to the base 7 of the bottom sailcloth 14, which coincides with the base of the sail 1, the sheaths 15 provided with the corresponding tie rods 16 are applied according to the plots of the force lines F, and subsequently a skin is applied that is substantially identical to the one disclosed above or to a plurality of panels 11 of thin thickness or of reduced area, the face 13 of which is made adhesive beforehand.

It should be noted that the faces 12 and 13 of the laminated material in mylard or another similar material must preferably be treated to be more greatly wettable by the layer of adhesive 2 that must be spread thereupon. The increase in the wettability of the laminate with which to make the panels 10 and 11 can be obtained by applying a known treatment and which is called "Corona" that provides for the application of an electric field of a set intensity normally used in the textile industry.

For what has been disclosed above, the sheaths 15 can be connected to the opposite faces 12 and 13 of the panels 10 and 11 of each sailcloth 14, in such a way as to constrain the tie rods on preset lines. It is therefore possible to interpret the sheaths 15 as insulation means that separates the tie rods 16 from the panels 10 and 11, and constrains them on the respective force lines F, in such a way as to leave them longitudinally free in relation to the sheaths 15 on maximum stress lines, and therefore also in relation to the panels 10 and 11.

Although easily understanding the type of the structural conformation of the sail 1, it should be noted that the tie rods 16 must necessarily be preassembled on the sheaths 15 and be substantially coaxial thereto, but that what has been disclosed above finds valid application independently of the nature of the sheaths 15 and of the tie rods 16 used to make the sail 1, and also independently of the type of tie rods 16. A particularly valid combination of sheaths 15 and of tie rods 16 is obtained starting from flexible longitudinal bodies comprising a plurality of free fibres 24 having high resistance and stiffness. Such flexible longitudinal bodies are normally said rovings 25 of free fibres 24 and comprise a bundle of free fibres 24 that are parallel to one another. Such fibres 24, clearly visible only in FIGS. 5 and 6, may be of homogenous material, have a constant transverse section, and be identical to one another, or be made by associating fibres 24 of identical material but with different sections. Or the roving 25 may be made by associating fibres 24 of material of a heterogeneous nature with an identical or different section. Naturally, the definition of combinations of set fibres are justified by the permissible value of the membrane stress envisaged for the sail, or on the basis of the maximum thickness of the sail 1.

The ratio of the areas of the transverse sections of fibres 24 of the same roving 25 may therefore be between 0.20 and 5, although, in order to contain the production costs of the sails, rovings 25 of free fibre of identical material and of substantially identical transverse section are normally used. In particular cases, sails may be used in which the ratio between the fibres 24 of larger diameter and the fibres of smaller diameter falls within the range 0.75-1.5.

The materials preferably but not necessarily used for the production of the fibres 24 of the rovings 25 may be of a homogenous or heterogeneous nature and in particular the following materials: Kevlar, carbon, glass, modified polyester of the type similar to the product Dyneema of the Dutch company DSM, which is also the owner of the trademark Dyneema, other types of aramidic fibre, such as for example Twaron of the Dutch company Teijin Twaron, which is also the owner of the trademark Twaron, and carbon fibres. Naturally, here and below, the quoted materials, in particular Dacron, Kevlar, Dyneema, Twaron, the carbon fibres and mylard are considered to be known and their respective physical properties with them, the values of which are included for reference implicitly, and which are omitted for the sake of brevity. Kevlar is a proprietary trademark of the Dupont Company.

Figure 4:
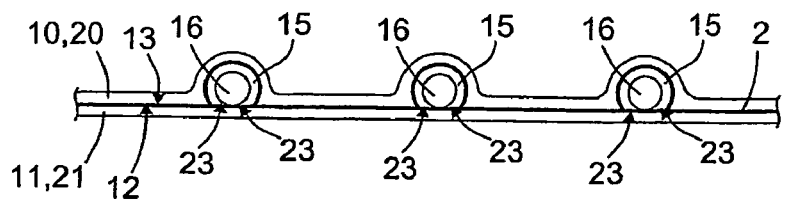
FIG. 4 illustrates a version of FIG. 3.

The sheaths 15 may have an annular section with a constant thickness, as in FIG. 3, but also have an asymmetric shape, and be internally delimited by an interrupted annular section at one of the two panels 10 and 11, and be conformed as a horseshoe, as in FIG. 4, wherein the interruption was shown at panel 10. In this way, each sheath 15 is longitudinally delimited by two respective strips 23, which are distinct from one another, that are connected together through the panel 10.

In this case, the panel 10 can be interpreted, between the strips 23 of the sheath, as part of the sheath 15 and as being suitable for acting as an awning panel of the other panel 11. In this way, the sheaths 15 have a reduced section, and so the thickness of the sail 1 is less, to the advantage of the diminution of the total mass.

Figure 5:
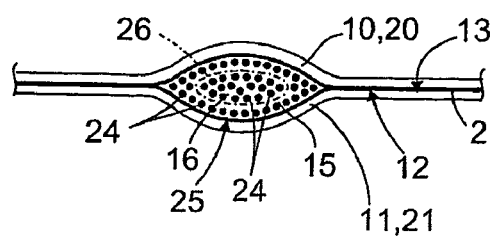
FIG. 5 illustrates, on an enlarged scale with parts removed for the sake of clarity, a portion of FIG. 3.
Figure 6:
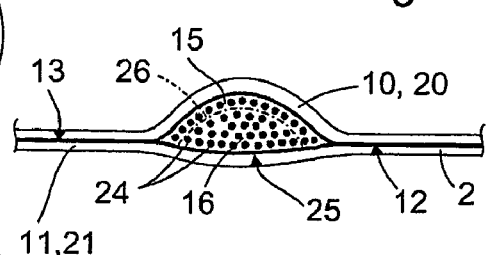
FIG. 6 illustrates, on an enlarged scale with parts removed for the sake of clarity, a portion of FIG. 4.

The combination of sheaths 15 and tie rods 16 is particularly light and simple to make in cases in which the sheath 15 and the tie rod 16 are made from the same roving 25. Such a particular constructional type is illustrated in FIGS. 5 and 6, and to make this clearer, the free fibres 24 belonging to the tie rod 16 have been separated from those of the sheath 15 associated with the sailcloth 14 by an annular line 26, conventionally shown by a dashed and dotted line that approximates to the actual demarcation line between the free fibres 24 belonging to the tie rod 16 and those belonging to the sheath 15. Line 26 finally delimits only the free fibres 24 and leaves outside the fibres 24 that constitute the sheath 15.

This conformation, which has been illustrated with reference to FIG. 3, is obtained when the adhesive 2 is present in sufficient thickness to impregnate the external portion of the roving 25 of free fibres 24 that are coupled with the faces 12 and 13. It should be noted that the adhesive 2 with which the faces 12 and 13 of the panels 10 and 11 of each sailcloth 14 are provided upon connection can be chosen from between so-called rubber resin, an acrylic compound preferably in the form of a gel, or a copolymer similar to polyethylene or PET. Impregnation of the roving 25 with the adhesive is completed at a temperature and pressure set inside a vacuum bag in the sense that the vacuum bag contains the group comprising the two panels 10 and 11 connected together in an adhesive manner, with the rovings 25 of free fibres 24 of the external portion impregnated with adhesive 2 in order to optimize the degree of adhesion between the elements listed above and to minimise any presence of air bubbles. To the phase of insertion into the vacuum bag and the phase of aspiration of the air contained therein, which is conducted to place in a vacuum the contents to ensure the adhesion of each pair of panels 10 and 11, there follows the phase of melting of the adhesive 2 through the application of heat at a temperature comprised within a set range which in the case of PET is between 100° C. and 130° C. This application of heat products the melting of the adhesive 2, which includes in a common plate the portion of impregnated fibres 24, and on cooling the adhesive 2 solidifies, causing the permanent viscous connection of an external annular portion of the roving 25 to the sailcloth 14, thus showing plastic consistency and flexibility. If only one of the two faces 12 and 13, and for the sake of convenience in particular the sole face 12 in FIG. 4, is adhesive or is made adhesive by the application of adhesive 2, the sole corresponding panel 10 is adhesive, and the portion of fibres 24 that are in contact with the panel 11 are free like those of the heart of the roving 25. This naturally contributes to making the sail 1 lighter and more flexible under an alternating aerodynamic load, but without it, as the free fibres 24 can freely help the geometrical variations of curvature, both in adjustment and in changes of tack.

Also the connection between the tie rods 16 with the peak 3, or the connection between the tie rods 16 with the edges 4', 5' and 7' of the sail 1 are performed hot. Nevertheless, it is also possible to perform finishing work cold, through the application of known reinforcements that are not shown of triangular or radial shape, the so-called patches in textile or laminate, which may be strengthened with their own structure of tie rods, or by flattening.

Naturally what has been disclosed above with reference to the sailcloths 14, and more in general the sail 1, also applies to the rigged panels 10 and 11, and which were therefore originally provided with their own lattice, normally used in sailing applications.

The use of the sail 1, which is a particular embodiment of a membrane body reinforced with tie rods 16 left longitudinally free in relation to the respective sailcloths 14, and easily understandable from what is disclosed above, does not require further explanations.

Lastly, it is clear that modifications and variations on the sail 1 disclosed here can be made without departing from the protective scope of the present invention.

The present invention also comprises sails 1 the sailcloths 14 of which have a sole panel 10 or 11 and therefore hold the sheaths 15 and the respective tie rods 16 connected in an adhesive manner to a sole face of the panel or to both the respective faces. Such a structure is simpler than those disclosed above inasmuch as it does not require the application of a top panel, it is more delicate but lighter. Owing to the particular simplicity of this structure, it has been decided not to illustrate it in any way. Such a constructional design could be validly implemented in sails that are affected by the current of air only on a respective face, both with tacks to the right and with tacks to the left, such as for example spinnakers, or in awnings of buildings that do not require reversibility.

Figure 8:
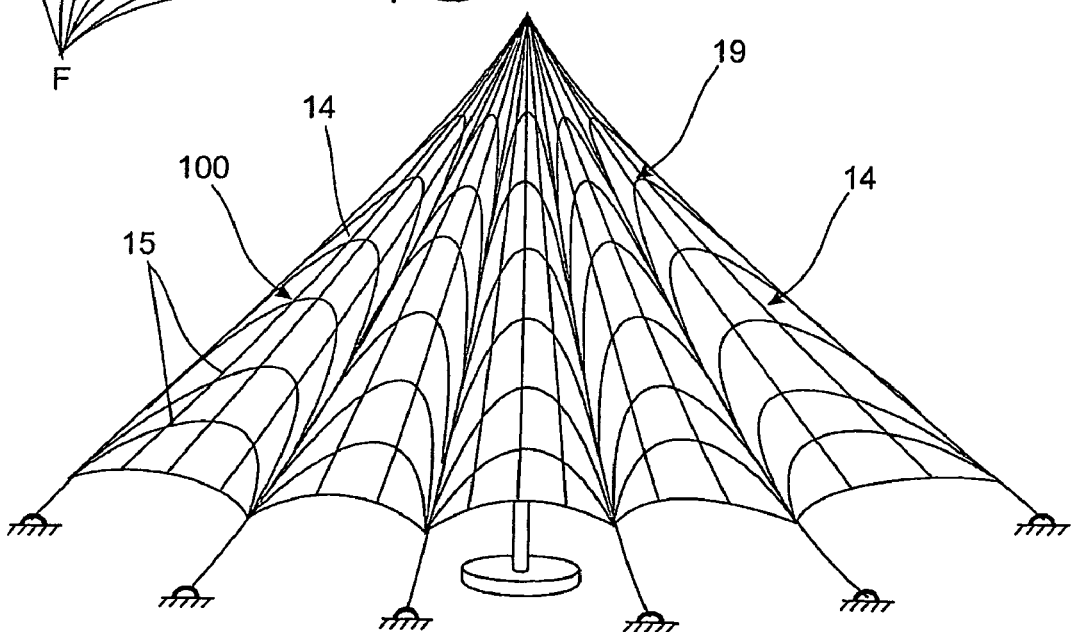
FIG. 8 is a schematic perspective view of a third preferred embodiment of FIG. 1.

With reference to FIG. 8, a three-dimensional membrane body 100 is schematically illustrated than can be validly used to act as an awning in the sector of civil engineering constructions. Such a body 100 is substantially identically to the sail 1 both structurally and functionally as much as it has a three-dimensional shape even without a load but is provided with concave portions under which to protect things and/or people from atmospheric agents. Also in this case, the tie rods 16 are contained inside sheaths 15 that can be applied directly to the two panels or alternatively, be obtained by hot lamination of the external portion of a roving 25 of free fibres, once it has been partially impregnated with an adhesive material of a thermoplastic nature, similarly to what has been disclosed with reference to sail 1. If the adhesive used is active at ambient temperature lamination can be carried out cold.

As regards what has been disclosed above, the body 100 and the sail 1 differ from one another only in shape and scope. The constructional details, the production method does not therefore change and for the sake of simplicity of disclosure it has been decided to refer to the parts of the disclosure relating to the structure and the means of obtaining the structure of the sail 1.

The use of the membrane body and relative production method is that of the stretched flexible structures used with the function of an awning and is easily understandable in the light of FIG. 8, and does not require particular explanations.

The invention claimed is:

1. Membrane body (1) comprising at least a first panel (10) and a second panel (11) connected together in an adhesive manner by respective facing faces (12, 13), and a plurality of tie rods (16) arranged stably between the panels (10, 11) according to set pattern; each said tie rod (16) having respective end portions (17, 18); said body further comprising insulation means (15) arranged between the panels and associated with each said tie rod (16) to leave said tie rod (16) longitudinally free between said panels (10, 11); said tie rod (16) being suitable for resisting a dual tensile membrane stress acting on each of said pair of panels (10, 11), and keeping said panels (10, 11) substantially free of tension during use; said second panel (11) covering said face (12) of said first panel (10) in such a way that said second panel (11) adheres integrally to said first panel (10) wherein said insulation means (15) comprises a plurality of flexible sheaths (15) arranged between said respective panels (10, 11) along force lines (F), each sheath housing a corresponding tie rod (16) in a longitudinally free manner, wherein said tie rod (16) comprises a plurality of fibres (24) free of a least a set material, that are arranged inside one said sheath (15) in such a way as to be longitudinally freely slideable, and wherein said sheath (15) has an annular section interrupted at a first panel (10) (11) of the two said panels (10, 11).

2. Body according to claim 1, wherein said sheath (15) is longitudinally delimited by two respective strips (23) that are distinct from one another; said first panel (10) (11) being suitable, between the two said strips (23), for completing said annular section of said sheath (15), to limit the masses in play and increase their flexibility.

3. Body according to claim 1, wherein said sheath (15) and the respective said tie rod (16) comprise fibres (24) with a homogenous composition.

4. Body according to claim 3, wherein the fibres (24) of said sheath (15) and the fibres of the respective said tie rod (16) have sections with a substantially identical value.

5. Body according to claim 3, wherein the sections of the fibres (24) of said sheath (15) and those of the respective said tie rod (16) differ from one another by a set coefficient.

6. Body according to claim 5, wherein said coefficient falls within a range 0.20-5.

7. Body according to claim 5, wherein said coefficient falls within a range 0.5-2.

8. Body according to claim 5, wherein said coefficient falls within a range 0.75-5.

9. Body according to claim 1, wherein said sheath (15) and the respective said tie rod (16) comprise fibres (24) with a heterogeneous composition.

10. Body according to claim 1, wherein said tie rod (16) has fibres (24) with a homogenous composition.

11. Body according to claim 1, wherein said tie rod (16) has fibres (24) with a heterogeneous composition.

12. Body according to claim 1 wherein said sheath (15) has an annular section interrupted at a second (11) (10) panel of said pair of panels (10, 11); said second panel (11) (10) being a covering panel of said first panel (10) (11).

\* \* \* \* \*

UNITED STATES PATENT AND TRADEMARK OFFICE
CERTIFICATE OF CORRECTION

PATENT NO. : 8,168,703 B2
APPLICATION NO. : 10/587096
DATED : May 1, 2012
INVENTOR(S) : PierCarlo Molta and Enrico Grassi It is certified that error appears in the above-identified patent and that said Letters Patent is hereby corrected as shown below:

Title page, item {73} should read:
{73} Assignee: VELERIA MARCO HOLM S.R.L.,
CAMPI BIZENZIO (IT) – owner of 50% of interest Signed and Sealed this
Twelfth Day of February, 2013

Teresa Stanek Rea
*Acting Director of the United States Patent and Trademark Office*